Nov. 30, 1926.                                                    1,608,915
R. K. THOMSON
AUTOMOBILE CURTAIN ARRANGEMENT
Filed Sept. 7, 1923        3 Sheets-Sheet 1

Inventor
Ralph K. Thomson
By Lancaster and Allwine
Attorneys

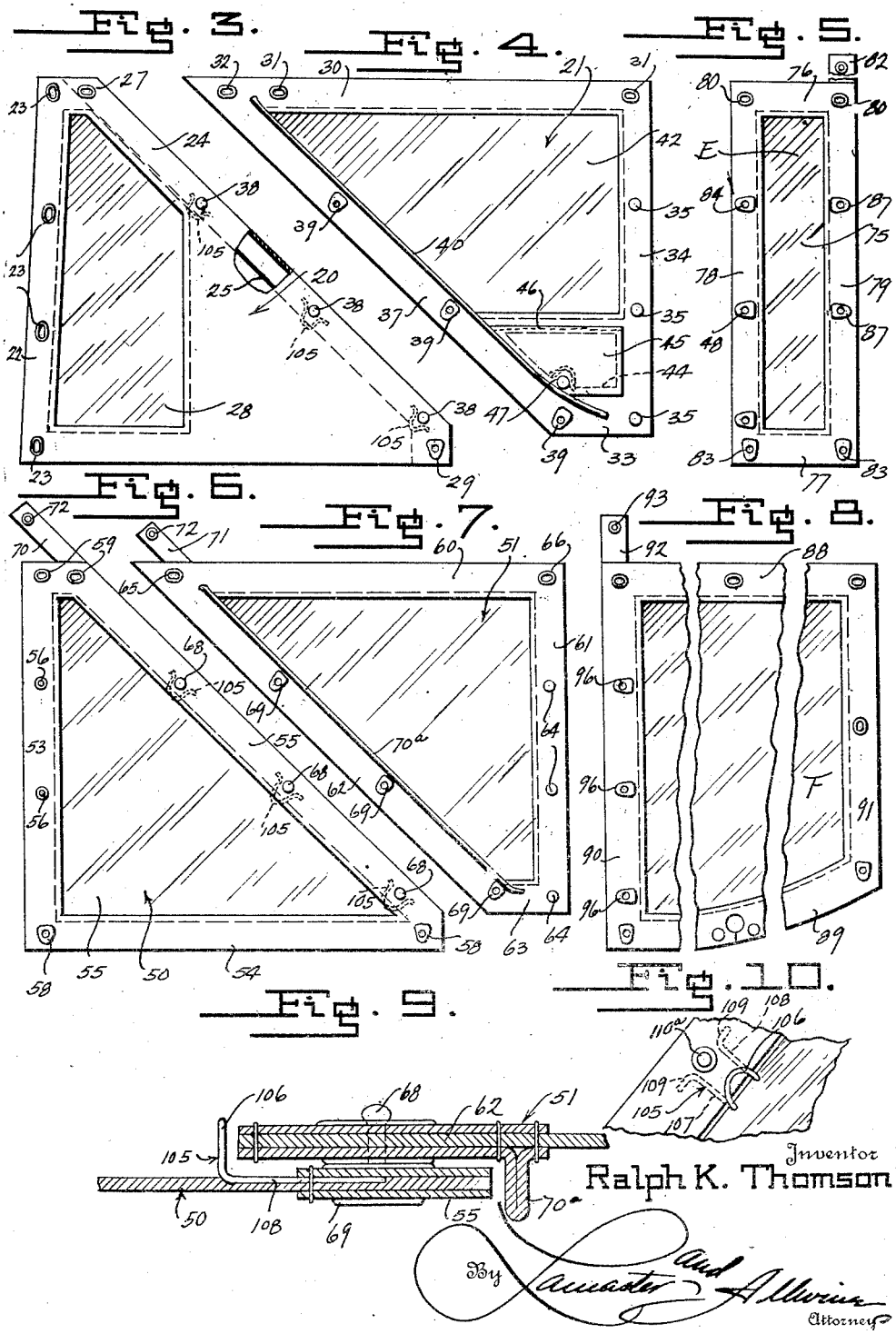

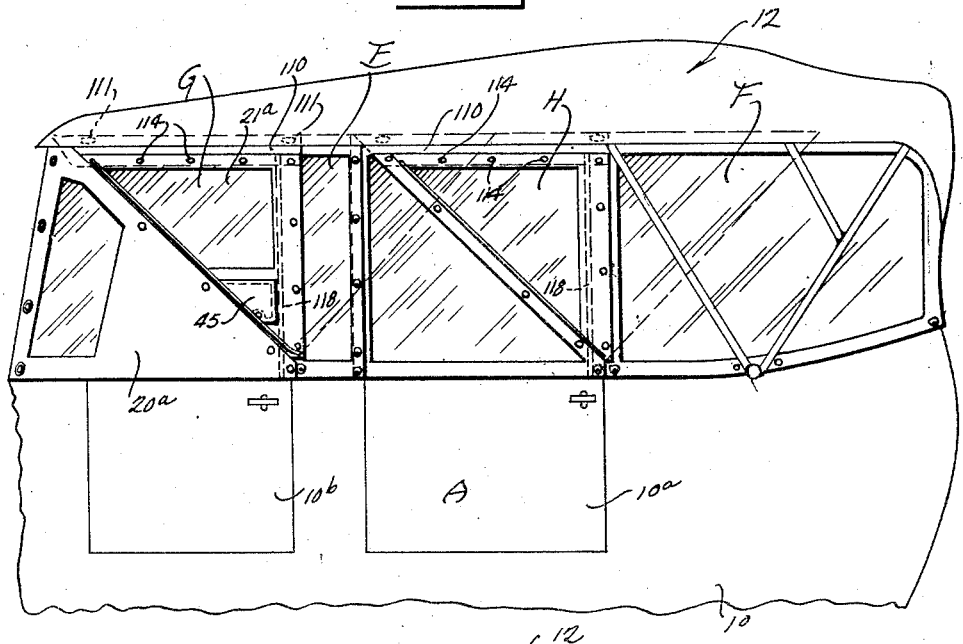
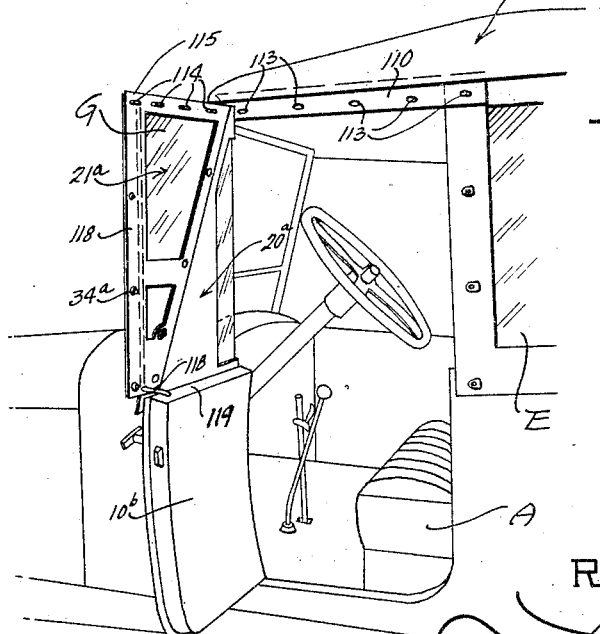

Patented Nov. 30, 1926.

1,608,915

UNITED STATES PATENT OFFICE.

RALPH K. THOMSON, OF SIOUX FALLS, SOUTH DAKOTA.

AUTOMOBILE CURTAIN ARRANGEMENT.

Application filed September 7, 1923. Serial No. 661,461.

This invention relates to improvements in curtains for automotive vehicles.

The primary object of this invention is the provision of a curtain arrangement for motor vehicles of the open car type, embodying a novel arrangement of parts which can be easily arranged to permit of the opening and closing of doors of the motor vehicle without inconveniencing the entrance or exit of persons into and from the motor vehicle.

A further object of this invention is the provision of novel curtain means for automotive vehicles embodying a curtain section normally adapted to be placed over the door of a motor vehicle and of such nature that it may be readily swung to the rear of the vehicle out of obstructing relation to the doorway thereof.

A further object of this invention is the provision of novel fastening means for the curtains of vehicles.

A further object of this invention is the provision of a novel curtain arrangement for motor vehicles, especially embodying a curtain panel which may be detachably connected to the motor vehicle parts so that it may be selectively swung with a door when the latter is opened, or disconnected with respect to the door and swung to the rear of the motor vehicle out of obstructing relation with respect to the doorway.

Other objects and advantages of this invention will be apparent during the course of the following detailed description.

In the accompanying drawings, forming a part of this specification, and wherein similar reference characters designate corresponding parts throughout the several views, Figure 1 is a side elevation of a motor vehicle showing the improved curtain arrangement applied thereto.

Figs. 3 and 4 are views showing the two sections of a panel arrangement which may be used over the front door of a motor vehicle.

Fig. 5 is a side elevation of a curtain panel which may be used on the motor vehicle between the front and rear doors thereof.

Figs. 6 and 7 are views showing sections of a panel arrangement which may be used over the rear door of the motor vehicle.

Fig. 8 is a fragmentary side elevation of a panel of a curtain which may be used to the rear at each of the sides of the vehicle.

Fig. 9 is a transverse cross sectional view showing structure of either of the panel arrangements adapted for use over the doors of a motor vehicle.

Fig. 10 is a perspective view of a curtain showing more particularly a novel means by which to facilitate the fastening of curtains from the inside of a vehicle.

Fig. 11 is a side elevation of a modified form of curtain arrangement which may embody the characteristics of the curtain arrangement illustrated in Figure 1.

Fig. 12 is a perspective view of a motor vehicle, showing a door thereof open, with the novel curtain arrangement swinging with the door; the curtain arrangement being that of the modification illustrated in Figure 11.

Figure 1:
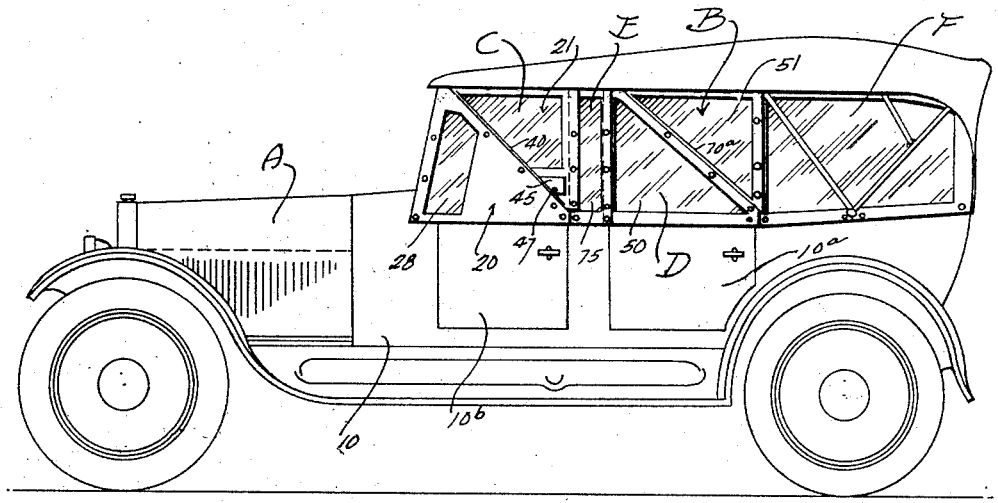

In the drawings, wherein for the purpose of illustration are shown preferred and modified forms of this invention, the letter A may generally designate the automotive vehicle, which may include a curtain arrangement B. The various units of the curtain arrangement may consist of a panel arrangement C adapted for use over the front door of the vehicle A; a panel arrangement D adapted for use over the rear door of a motor vehicle; the intermediate panel E adapted to be used between the doors; and a rear panel F adapted to be used to the rear of the panel arrangement D.

The automotive vehicle A is of course of the open type, and preferably includes the body 10; windshield 11; and roofing structure 12 which may include the bows 14, collapsible supporting frame 15, and canopy 16.

Referring to the construction of the panel arrangement C, the same includes a front section 20, and a rear section 21, which are complemental parts, each being substantially triangular in formation, and adapted to be connected upon their hypotenuse sides or edges to form substantially a rectangle.

The front section 20 is higher than the rear section 21, and at its forward margin portion 22 is preferably provided with a series of eyelets 23 which may be used in connecting the section 20 at the front of the motor vehicle A, to the body 10 and windshield 11 thereof. Along the hypotenuse margin portion 24, and between the layers of the section 20, it is preferred to place an elongated strip of buckram or celluloid 25 for reinforcing purposes. At the top of the section 20 it is preferred to locate an eyelet 27, which may be used in connecting the section 20 to a bow of the roof structure 12. A relatively small transparent pane 28, of celluloid or analogous diaphanous material may be secured in the curtain section 20, adjacent the forward marginal portion 22 thereof; it being preferred that this pane 28 be relatively narrow, both from an economical standpoint and facility in folding of the section 20. An eyelet 29 may be provided at the lower rear corner of the section 20, to aid in attachment of the section 20 to the upper right hand corner of the front door 10$^b$ of the motor vehicle.

The rear section 21 of the panel C preferably has the upper margin portion 30 thereof provided with eyelets 31 for connection to suitable fasteners which may be positioned on a bow of the vehicle roof. An eyelet 32 is also positioned at the upper front corner which may overlap in aligning relation with the eyelet 27 of the section 20 to be secured to the same fastener of the roof structure 12 which receives the eyelet 27. As before mentioned the section 21 is less in height than the section 20, and in consequence thereof the lower marginal portion 33 of the section 21, when the latter is attached to a vehicle, is always located above the top edge of the vehicle body 10, and is not fastened to the body 10. At its rear marginal portion 34 the section 21 is preferably provided with the male parts 35 or fastener structures, which may be used for connection to the panel E of the curtain arrangement. Along the hypotenuse portions 24 and 37 of the sections 20 and 21 respectively it is preferred to locate the stud and eyelet portions 38 and 39 respectively of fastener arrangements; it being preferred to provide the studs 38 on the section 20 so that the marginal portion 24 thereof overlies exteriorly the marginal portion 37. This necessitates that the sections 20 and 21 be, in most instances, closed from the inside of the motor vehicle. Means to facilitate such closing is provided on the section 20, which will be subsequently described. A reinforcing and water shed piece 40 is provided as a part of the construction of the margin portion 37 of the section 21, being stitched as a part thereof, in a plane at right angles to the normal plane of the section 21, just to the rear of the eyelets 39, and substantially as is illustrated in Figure 4 of the drawings. The lower portions of this reinforcing and water shed strip 40 may be arcuated to the rear. While reinforcing the section 21, this strip 40 also prevents water from entering the joint between the sections 20 and 21.

A transparent pane 42 is provided in the major area of the section 21. Below the pane 42, and in the curtain section 21, an opening 44 is provided, of sufficient dimension to permit of a driver inserting his hand and arm therethrough to display the same exteriorly of the car for signaling purposes. A flap 45 is preferably hingedly connected, as by stitching 46, at the upper marginal edge portion thereof, so that the flap 45 depends exteriorly of the section 21, and may be readily opened by pressure of an operator's hand thereagainst. A snap fastener 47 may be employed in connection with flap 45 to secure the same to the body of the section 21.

Referring to the panel arrangement D which is adapted to be positioned over the rear door 10$^a$ of a motor vehicle, and as detailed in Figures 6 and 7, the same preferably comprises front and rear substantially triangular shaped sections 50 and 51. They are complements of each other in providing a rectangular shaped panel, although the rear section 51 is not as high as the section 50, which construction is provided in order to facilitate the inside swinging of the section 51 to the rear of the vehicle when it is desired to position the section 51 out of the door way. The section 50 preferably includes the front marginal portion 53; bottom marginal portion 54; and hypotenuse marginal portion 55 which receives therebetween the pane 55 of celluloid or analogous material, in any approved construction. The marginal portion 53 preferably has studs 56 thereon which are adapted for cooperation with certain eyelets on the intermediate panel E to be subsequently described. Suitable eyelets 58 may be provided on the lower corners of the section 50 as a means of fastening the section 50 to the vehicle body. At the top of the section 50 suitable eyelets 59 may be provided as a means of fastening the section to a bow of the roofing structure 12.

Figure 2:
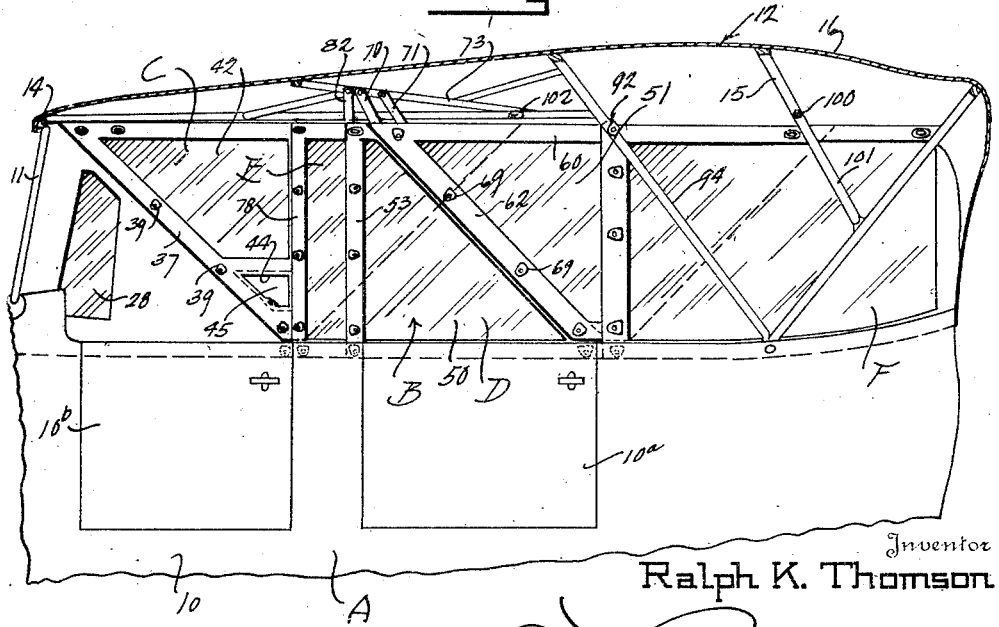
Fig. 2 is a fragmentary view taken longitudinally through the motor vehicle illustrated in Figure 1, and showing the inside view of the curtain arrangement as applied to the vehicle.

The section 51 includes the upper marginal portion 60; a rear marginal portion 61; hypotenuse portion 62; and preferably a relatively short lower portion 63. The latter portion, when the sections 50 and 51 are connected is higher than the portion 54 of the section 50. Suitable studs 64 may be provided upon the rear marginal portion 61 as a means of connecting the section 51 to the rear panel F. An eyelet 65 may be provided in the top portion 60 at the front corner thereof, which may align with one of the eyelets 59 of the section 50, when the sections of the panel D are in connected relation. Another upper eyelet 66 may be provided in the upper rear corner of the section 51, as a means of connecting this section to a suitable fastener in the bow of the roofing structure 12. On the hypotenuse portions 55 and 62 of the sections 50 and 51 respectively it is preferred to provide cooperating studs 68 and eyelets 69; the latter being on the section 51, so that the flap or marginal portion 55 is always outermost. Along the marginal portion 62, and to the rear of the eyelet 69, it is preferred to provide a diagonally positioned reinforcing strip 70ª, which is analogous to the reinforcing and water shed strip 40 described for the section 21 of the panel arrangement C. At the upper front corners of the sections 50 and 51, it is preferred to provide forwardly inclined fastener strips 70 and 71 upon the sections 50 and 51 respectively, which may have suitable fastener elements 72 at the free ends thereof, adapted to cooperate with companion fastener parts which may be located on brace 73 of the collapsible roofing frame 15, substantially as is illustrated in Figure 2 of the drawings.

The intermediate panel E, may be of relatively narrow rectangular formation, having a pane 75 supported between the upper and lower marginal portions 76 and 77 respectively, and the front and rear marginal portions 78 and 79 respectively. At the upper corners of the panel E suitable eyelets 80 may be provided to receive suitable fasteners of the roofing structure 12. At the upper rear corner an elastic or flexible tab 82 may be provided for attachment to the brace 73 above described. At the lower corners of the panel E suitable eyelets 83 may be provided by means of which the panel E may be attached to the suitable companion studs located upon the body 10 of the vehicle A. Along the front marginal edge suitable eyelets 84 may be provided for receiving studs 35 of the section 21; it thus being obvious that the rear margin portion 34 of the section 21 overlies the front margnal portion 78 of the panel E. The rear marginal portion 79 of the panel E has suitable eyelets 87 therein which may be provided for receiving the studs 56 in the section 50; the portion 79 overlying the marginal portion 53 of the section 50 to effect such fastening arrangement.

The rear panel F may be of any suitable formation, consistent with the design of the vehicle A upon which it is to be positioned. The panel F may include suitable upper and lower marginal portions 88 and 89 respectively, and front and rear marginal portions 90 and 91 respectively. At the upper front corner of the panel F an upwardly extending attaching tab 92 is provided, having a fastening element 93 thereon which may cooperate about a brace 94 of the roof structure 12. At the front marginal portion 90 of the panel F suitable eyelets 96 may be provided which receive the studs 64 of the panel section 51 therein; the rear flap 61 of the panel section 51 overlying the forward marginal portion 90 of the panel F to secure such attachment. The remaining marginal portions of the panel F may have suitable fasteners or eyelets therein to cooperate with the roofing and body structures of the vehicle.

Referring to the cooperation of the various panels and sections thereof, it is to be noted that the panel C is disposed over the front door 10ᵇ of the vehicle A, and the panel D over the rear door 10ª of the vehicle A. The panels C, D, E and F are, of course, disposed at each side of the vehicle A, in accordance with the construction illustrated. The rear sections 21 and 51 of the panel arrangements C and D respectively are connected exteriorly to adjacent fastener elements of adjacent panels, so that said sections 21 and 51 may swing upon their rear marginal portions inwardly of the vehicle A, and over the inside of the curtain arrangement, so that they may be positioned in an out of the way location when it is desired to utilize the entire door space above the body of the vehicle A, or when the spaces which these sections 21 and 51 normally close are desired to be left open for ventilation within the car. The rear section 51 of the panel arrangement D may be connected in its rearwardly folded position, as illustrated by the dotted lines in Figure 2 of the drawings, by attaching one of the upper fastener elements to a fastener element 100 which is illustrated in Figure 2 of the drawings as being positioned upon a roof brace 101, although the location of the same should not be restricted. Similarly, the front panel C may have the section 21 thereof folded within the vehicle, as illustrated by the dotted line, any of the fastener elements on the section 21 thus cooperating with a fastener element 102 which may be located in any suitable position on the vehicle, as illustrated in Figure 2 of the drawings.

The provision of the tabs 70, 71, 82 and 92, which may be of elastic, enables the various sections and panels of the curtain arrangement to be maintained taut, affording additional fastening therefor.

The means above referred to, to permit the inside fastening of the various sections of the curtain arrangement, preferably comprises a wire hand grip member 105, which may be positioned on the outside flaps of the curtains, facing inwardly to enable the operator to grasp the same to pull the outside flap towards him while the inside flap is being connected thereto by means of the elements connected to said flaps. This fastener member 105 is preferably of wire, bent intermediate its ends to provide a finger engaging loop 106. Legs 107 and 108, preferably in spaced parallel relation are bent in a plane at right angles to the plane defined by the loop 106; it being preferred to relatively outturn the end portions 109 of said legs 107 and 108. The outturned portions 109, and the major lengths of the legs 107 and 108 are preferably embedded between layers of the curtain to which they are secured, so that the legs 107 and 108 straddle the fastener element 110ᵇ at the inside surface of the curtain. The finger or hand engaging loop 106, of course, extends inwardly from the inside surface of the curtain, substantially at a right angle thereto, as is illustrated in Figure 9 of the drawings, and forms a means of gripping the curtain to pull the same toward the person within the vehicle when it is desired to snap the fastener elements upon two flaps together.

Because of the fact that the sections 21 and 51 of the panels C and D respectively do not extend for connection to the doors or to the body of the vehicle, it is preferred that the lower rear corner portion of the front sections 20 and 50 which cooperate therewith extend beyond the free upper corners of the doors 10ᵇ and 10ᵃ of the vehicle, as illustrated in Figure 1 of the drawings, as a means of overlapping all joints to prevent entrance of water into the vehicle when the curtain arrangement B is in place.

Referring to the curtain arrangement as illustrated in Figures 11 and 12 of the drawings, the panel arrangements G and H, except as herein noted, are of identical construction respectively with the panel arrangements C and D above set forth.

The panel G preferably includes complemental front and rear sections 20ᵃ and 21ᵃ respectively, the former being of identical construction with the section 20 above described. The section 21ᵃ is of somewhat altered construction, including an upper strip 110, which has suitable fastener elements 111 thereon by means of which the same may be secured to a bow of the roofing structure 12. The depending and exposed portion of the strip 110 is preferably provided with a plurality of eyelets 113 which may receive the studs or suitable fastening elements 114 carried at the inside surface of the upper marginal portion 115 of the section 21ᵃ, substantially as is illustrated in Figure 12 of the drawings. A steel rod 118 is preferably provided, which may be vertically carried within a socket provided inwardly from the top margin 119 of the vehicle door 10, substantially as is illustrated in Figure 12 of the drawings; this rod 118 being adapted for disposal within a vertical pocket provided in the rear marginal portion 34ᵃ of the section 21ᵃ. This provides a means for supporting the section 21ᵃ on top of the vehicle door 10ᵇ, so that the latter may be swung open with the panel section 21ᵃ in supported relation thereby, and in cooperating relation with the panel 20ᵃ. It is thus obvious that the marginal portion 115 must clear the roofing structure, and is hence relatively lower than the marginal portion 30 of the panel 21 above described. The strip 110 is detachably associated with both the roofing structure of the vehicle and with its panel section 21ᵃ, so that the panel section 21ᵃ may be selectively supported by the door 10ᵇ, when the latter is open, as illustrated in Figure 12 of the drawings, or it may be used as above described, and swung inwardly of the vehicle with the strip 110 attached thereto, for securing the panel section 21ᵃ on the inside of the curtain arrangement, as is illustrated by the dotted line in Figure 11 of the drawings.

Various changes in the shape, size, and arrangement of parts may be made to the forms of invention herein shown and described, without departing from the spirit of the same or the scope of the claims.

I claim:

1. An automobile curtain adapted to be positioned over the door of a vehicle comprising front and rear sections, means for connecting the front section to the automobile and door to swing with the door when the latter is open, and means for fastening the rear section to the automobile and door so that the same may be selectively swung with the door when the same is open, or swung to the rear of the automobile out of obstructing relation with the doorway when the door is to be opened.

2. An automobile curtain adapted for use over the doors of automotive vehicles comprising a body portion adapted for detachable connection with the door of the automobile so that the same may swing therewith, a strip for detachable connection with the body portion of the curtain and with the roof structure of the vehicle, and means for connecting the body portion of said curtain to the rear of said door so that said curtain with its strip in connected relation therewith may swing to the rear of the door in an out of the way position with respect to the doorway.

3. The combination with an automobile including a body, a door therefor, and a roof structure, of a curtain arrangement including front and rear substantially triangular shaped sections, means for detachably connecting the front section to the automobile and to the door to swing with the door when opened, means for detachably connecting the rear section with the front section and with said door to swing with the door in stable upright position therewith, a strip for detachable connection with the upper marginal portion of said rear curtain section and for detachable connection with the roof structure of said automobile, and means for detachable connection of the rear marginal portion of said rear curtain section to the automobile so that when the same is relatively disconnected from the front section of the curtain and the strip thereof is disconnected from the roof structure, said rear section is permitted to swing to the rear out of obstructing relation with respect to the doorway.

4. In combination with an automobile including an entrance door, a curtain construction for connection to the automobile above the door including a front section adapted to be connected for swinging with the door, and a rear section complemental with the front section and less in height than the front section, means connecting the rear section to the automobile so that it may be swung away from the door out of obstructing relation from above said door, and means for fastening said rear section in its last mentioned position.

RALPH K. THOMSON.